United States Patent
Sato et al.

(10) Patent No.: US 10,584,750 B2
(45) Date of Patent: Mar. 10, 2020

(54) GREASE COMPOSITION AND GREASE-FILLED WHEEL BEARING

(71) Applicants: Kyodo Yushi Co., Ltd., Fujisawa-shi, Kanagawa (JP); NTN Corporation, Osaka-shi, Osaka (JP)

(72) Inventors: Yuta Sato, Fujisawa (JP); Daisuke Tsutsui, Yokohama (JP); Junichi Imai, Fujisawa (JP); Shinsuke Hirano, Iwata (JP)

(73) Assignees: KYODO YUSHI CO., LTD., Fujisawa-Shi, Kanagawa (JP); NTN CORPORATION, Osaka-Shi, Osaka (JP)

( * ) Notice: Subject to any disclaimer, the term of this patent is extended or adjusted under 35 U.S.C. 154(b) by 78 days.

(21) Appl. No.: 15/125,439

(22) PCT Filed: Mar. 12, 2015

(86) PCT No.: PCT/JP2015/057286
§ 371 (c)(1),
(2) Date: Sep. 12, 2016

(87) PCT Pub. No.: WO2015/137440
PCT Pub. Date: Sep. 17, 2015

(65) Prior Publication Data
US 2017/0074326 A1   Mar. 16, 2017

(30) Foreign Application Priority Data
Mar. 12, 2014 (JP) .................. 2014-049070

(51) Int. Cl.
*C10M 163/00* (2006.01)
*C10M 173/02* (2006.01)
(Continued)

(52) U.S. Cl.
CPC ....... *F16C 33/6633* (2013.01); *C10M 101/02* (2013.01); *C10M 105/04* (2013.01);
(Continued)

(58) Field of Classification Search
CPC .................. C10M 105/08; C10M 137/08
(Continued)

(56) References Cited

U.S. PATENT DOCUMENTS 6,417,143 B1    7/2002  Mikami et al.
8,399,390 B2 *  3/2013  Wu ...................... C10M 107/02
                                                   208/19
(Continued)

FOREIGN PATENT DOCUMENTS

CN    101636477 A    1/2010
CN    102770514 A    11/2012
(Continued)

OTHER PUBLICATIONS

International Search Report (PCT/ISA/210) dated Jun. 1, 2015, by the Japan Patent Office as the International Searching Authority for International Application No. PCT/JP2015/057286.
(Continued)

*Primary Examiner* — Prem C Singh
*Assistant Examiner* — Francis C Campanell
(74) *Attorney, Agent, or Firm* — Buchanan, Ingersoll & Rooney PC

(57) ABSTRACT

Provided is a grease composition for a wheel bearing, containing (a) a base oil consisting of a mineral oil and a synthetic hydrocarbon oil, wherein the ratio of the synthetic hydrocarbon oil to the total amount of the mineral oil and the synthetic hydrocarbon oil is 40 to 60 mass %, and the base oil has a kinematic viscosity at 40° C. of 40 to 65 mm$^2$/s; (b) a thickener of formula (A) wherein R$^2$ is diphenylmethane,
(Continued)

and $R^1$ and $R^3$, which may be the same or different from each other, each represent cyclohexyl group or a straight-chain or branched alkyl group having 16 to 20 carbon atoms, with a molar ratio of the cyclohexyl group to the total number of moles of the cyclohexyl group and the alkyl group being 50 to 90 mol %; (c) an amine type antioxidant; and (d) an amine phosphate type antiwear agent.

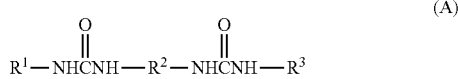

(A)

10 Claims, 1 Drawing Sheet

(51) Int. Cl.
| | |
|---|---|
| *F16C 33/66* | (2006.01) |
| *F16C 19/18* | (2006.01) |
| *C10M 169/06* | (2006.01) |
| *C10M 135/10* | (2006.01) |
| *C10M 135/18* | (2006.01) |
| *C10M 137/08* | (2006.01) |
| *C10M 101/02* | (2006.01) |
| *C10M 115/08* | (2006.01) |
| *C10M 105/04* | (2006.01) |
| *C10M 133/04* | (2006.01) |

(52) U.S. Cl.
CPC ........ *C10M 115/08* (2013.01); *C10M 133/04* (2013.01); *C10M 135/10* (2013.01); *C10M 135/18* (2013.01); *C10M 137/08* (2013.01); *C10M 169/06* (2013.01); *F16C 19/186* (2013.01); *C10M 2203/003* (2013.01); *C10M 2203/1006* (2013.01); *C10M 2205/0206* (2013.01); *C10M 2205/0285* (2013.01); *C10M 2215/02* (2013.01); *C10M 2215/064* (2013.01); *C10M 2215/1026* (2013.01); *C10M 2219/044* (2013.01); *C10M 2219/068* (2013.01); *C10M 2223/043* (2013.01); *C10N 2220/022* (2013.01); *C10N 2230/02* (2013.01); *C10N 2230/06* (2013.01); *C10N 2230/10* (2013.01); *C10N 2230/12* (2013.01); *C10N 2250/10* (2013.01); *F16C 2326/02* (2013.01)

(58) Field of Classification Search
USPC .............................................. 508/364, 528
See application file for complete search history.

(56) References Cited

U.S. PATENT DOCUMENTS

| | | | |
|---|---|---|---|
| 2007/0155634 A1 | 7/2007 | Kubota et al. | |
| 2008/0149529 A1* | 6/2008 | Rosenbaum | C10M 111/04 208/19 |
| 2009/0003742 A1* | 1/2009 | Nakatani | B60B 27/0005 384/289 |
| 2009/0247441 A1* | 10/2009 | Baum | C10M 169/00 508/552 |
| 2010/0087344 A1* | 4/2010 | Saita | C10M 169/06 508/100 |
| 2010/0087349 A1* | 4/2010 | Lee | C10M 111/04 508/499 |
| 2010/0093567 A1 | 4/2010 | Endo et al. | |
| 2012/0196781 A1 | 8/2012 | Namiki et al. | |
| 2012/0314985 A1 | 12/2012 | Saita et al. | |
| 2013/0130953 A1* | 5/2013 | Spagnoli | C10M 115/08 508/136 |
| 2013/0310292 A1 | 11/2013 | Yamamoto et al. | |
| 2014/0193110 A1 | 7/2014 | Soga et al. | |
| 2015/0024981 A1 | 1/2015 | Ayame et al. | |
| 2015/0225668 A1 | 8/2015 | Endo et al. | |

FOREIGN PATENT DOCUMENTS

| | | |
|---|---|---|
| CN | 103415603 A | 11/2013 |
| JP | S 61-162595 A | 7/1986 |
| JP | 2000-198993 A | 7/2000 |
| JP | 2006-077056 A | 3/2006 |
| JP | 2008-239687 A | 10/2008 |
| JP | 2008286230 A | 11/2008 |
| JP | 2010-132746 A | 6/2010 |
| JP | 2011-084646 A | 4/2011 |
| JP | 2011-516661 A | 5/2011 |
| JP | 2012-087221 A | 5/2012 |
| JP | 2013-181156 A | 9/2013 |
| JP | 2013-253256 A | 12/2013 |
| WO | 2013046598 A1 | 4/2013 |

OTHER PUBLICATIONS

Written Opinion (PCT/ISA/237) dated Jun. 1, 2015, by the Japan Patent Office as the International Searching Authority for International Application No. PCT/JP2015/057286.
Yuji Yamamoto et al., Tribology, Feb. 28, 1998, pp. 201-203, Rikogakusha Publishing Co.
H. Wenxuan, "Properties and Applications of Lubricant Additives", China Petrochemical Press Co., Ltd., May 31, 2012, with English Abstract. (4 pages).
Office Action dated Apr. 13, 2018, by the Chinese Patent Office in corresponding Chinese Patent Application No. 201580013123.1. (8 pages).

* cited by examiner

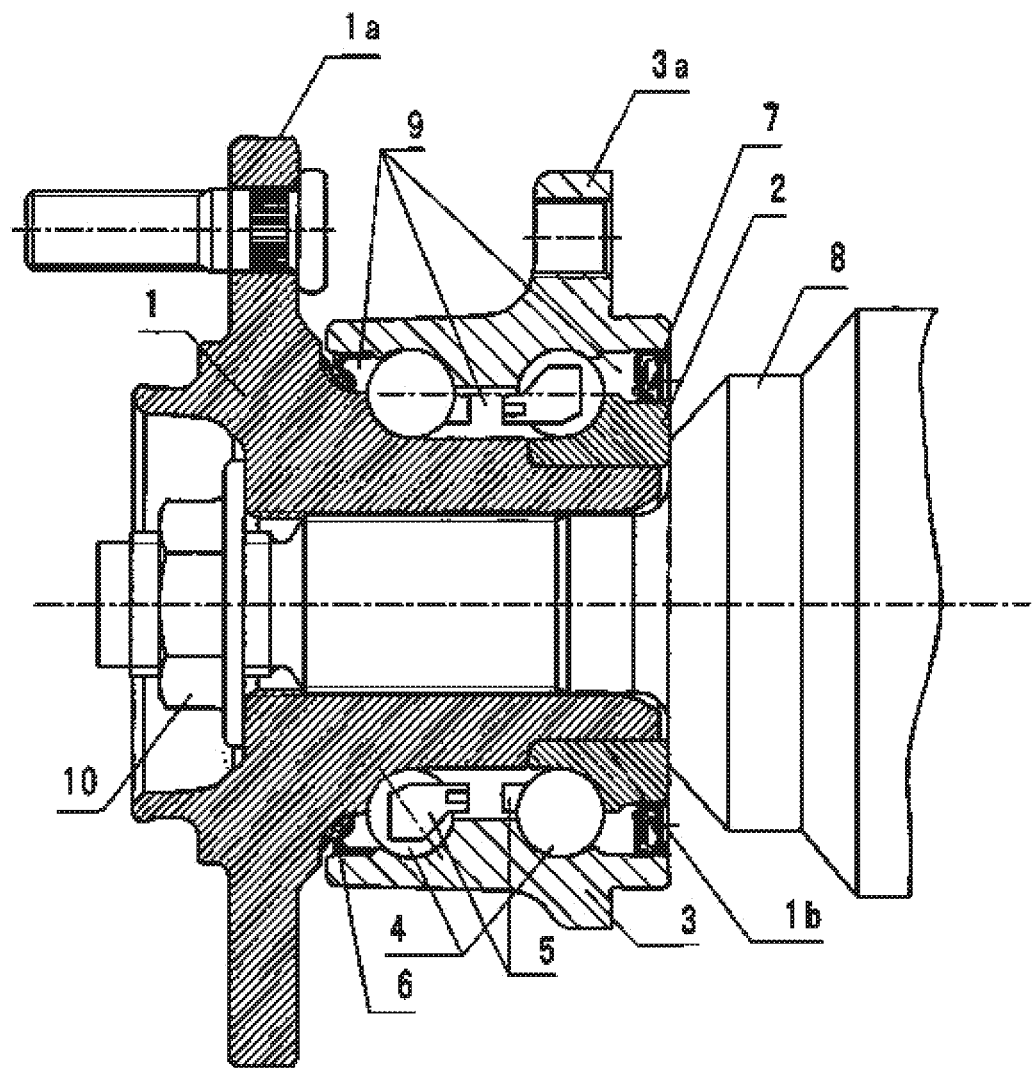

GREASE COMPOSITION AND GREASE-FILLED WHEEL BEARING

TECHNICAL FIELD

The present invention relates to a grease composition to be filled in a wheel bearing, which can satisfy the low torque performance, and show the long anti-flaking life and lubrication life under high temperatures and excellent anti-fretting properties under low temperatures; and a wheel bearing where the above-mentioned grease composition is filled.

BACKGROUND ART

From the viewpoint of reduction in use of electricity, the electrical machinery and appliances and mechanical parts used not only in the automobiles, but also in a variety of industries have been recently required to have higher efficiency. For this purpose, many attempts have been made, for example by reducing the weight of the parts, improving the structure, and the like. One of the methods for upgrading the efficiency in the automobile is considered to reduce the torque of the wheel bearing. Similarly, it becomes important for the grease for the wheel bearing to exhibit low torque performance over a wide temperature range extending from low to high temperatures.

The wheel bearing is disposed in proximity to the brake. When the brakes are continuously applied on a downward slope, for example, the wheel bearing may be exposed to high temperatures. In such a case, the surface initiated flaking may take place to shorten the anti-flaking life because the viscosity of the base oil used for the grease becomes too low to form a sufficient oil film. In addition, the circumstances of high temperature cause the grease to deteriorate, which may shorten the lubrication life. It is therefore necessary to choose a grease that can fully satisfy the anti-flaking life and the lubrication life.

The automobiles are often transported by train or truck. During the transportation, fretting may occur on the grease-applied parts to be lubricated due to minute vibrations induced by rail joints and rough roads. Particularly under the circumstances of low temperature, the grease cannot sufficiently flow into the parts to be lubricated because of low fluidity of the grease base oil, thereby causing the fretting as mentioned above. To solve the fretting problem, the parts have been improved, and the grease with improved anti-fretting properties has been employed.

For reducing the torque, there are methods of making the kinematic viscosity of base oil as low as possible, softening the grease, and decreasing the amount of grease applied to the mechanical parts. For example, JP 2000-198993 A proposes a grease composition where the base oil comprising an ester oil has a kinematic viscosity at 40° C. of 10 mm$^2$/s or more.

The reduction in kinematic viscosity of the base oil can lower the torque because the resistance to stirring becomes low. However, a sufficient oil film cannot be formed, which may cause the surface initiated flaking and shorten the lubrication life due to the evaporation, so that the life of the bearing cannot be completed.

When the grease is softened, the resulting grease is apt to leak out, which will shorten the lubrication life, and cause the flaking due to insufficient oil film formation to result in the unsatisfactory anti-flaking life. When the amount of grease is decreased, the amount of grease fed to the parts to be lubricated becomes smaller, which cannot satisfy the lubrication life.

The fretting is a surface damage induced under a minute amplitude of vibration, to generate oxidized debris in the air, which is said to often cause considerable wear by the abrasive action (Yuji Yamamoto et al., "Tribology" Rikogakusha Publishing Co., Ltd., issued on 28, Feb. 1998, pp. 201-203). To prevent the fretting, there are some proposals, for example, (1) to decrease the relative amplitude of sliding motion, (2) to separate the surfaces so as not to come in a direct contact therewith, and (3) to prevent the surfaces from adhering to each other by coating a phosphate film or the like on the contact surfaces or feeding a lubricating oil or grease to the contact surfaces (Yuji Yamamoto et al., "Tribology" Rikogakusha Publishing Co., issued on 28, Feb. 1998, pp. 201-203). There is disclosed a grease composition with improved anti-fretting properties, comprising a urea thickener, a base oil, a phosphorothioate compound and an amine compound (JP 2008-239687 A). However, the fretting wear cannot be sufficiently prevented when the conditions become severer than conventionally supposed (i.e., at the temperature of as low as −30° C., under extremely minute amplitude of vibration). Any measures other than the prior arts mentioned above are needed for improving the fretting wear.

PRIOR ART REFERENCES

Patent Documents

Patent document 1: JP 2000-198993 A
Patent document 2: JP 2008-239687 A

Non-Patent Documents

Non-Patent document 1: Yuji Yamamoto et al., "Tribology" Rikogakusha Publishing Co., issued on 28, Feb. 1998, pp. 201-203

SUMMARY OF INVENTION

Technical Problem

An object of the invention is to provide a grease composition to be filled in a wheel bearing, which can satisfy the low torque performance, show a long anti-flaking life and a long lubrication life even under high temperatures, and minimize the fretting wear under minute vibrations at low temperatures.

Solution to Problem

The inventors of the invention have successfully improved the low torque performance of the above-mentioned wheel bearing, the life of bearing, and the anti-fretting properties under minute vibrations at low temperatures by choosing as the base oil a mixed oil of a mineral oil and a synthetic hydrocarbon oil, a urea compound as the thickener, and as the additives an amine antioxidant and an amine phosphate type antiwear agent.

Accordingly, the invention provides the following grease composition and grease-filled wheel bearing:

1. A grease composition for a wheel bearing, comprising the following components (a) to (d):
 (a) a base oil consisting of a mineral oil and a synthetic hydrocarbon oil, wherein the ratio of the synthetic hydrocarbon oil to a total amount of the mineral oil and the synthetic hydrocarbon oil is 40 to 60 mass %, and the base oil has a kinematic viscosity at 40° C. of 40 to 65 mm²/s;

(b) a thickener represented by the following formula (A):

(A)

wherein $R^2$ is diphenylmethane; and $R^1$ and $R^3$, which may be the same or different from each other, each represents cyclohexyl group or a straight-chain or branched alkyl group having 16 to 20 carbon atoms, with a molar ratio of the cyclohexyl group to the total number of moles of the cyclohexyl group and the alkyl group, expressed by [((the number of cyclohexyl groups)/(the number of cyclohexyl groups+the number of alkyl groups))×100] being 50 to 90 mol %;

(c) an amine type antioxidant; and (d) an amine phosphate type antiwear agent.

2. The grease composition described in the above-mentioned item 1, wherein the amine phosphate type antiwear agent is a tertiary alkylamine-dimethyl phosphate, which is contained in an amount of 0.05 to 5 mass % based on the total mass of the grease composition.

3. The grease composition described in the above-mentioned item 1 or 2, further comprising a rust inhibitor comprising an organic sulfonate and an amine compound.

4. The grease composition described in the above-mentioned item 3, wherein the organic sulfonate is a calcium sulfonate, which is contained in an amount of 0.05 to 5 mass % based on the total mass of the grease composition.

5. The grease composition described in the above-mentioned item 3 or 4, wherein the amine compound is an amine salt of a fatty acid, which is contained in an amount of 0.05 to 5 mass % based on the total mass of the grease composition.

6. The grease composition described in any one of the above-mentioned items 1 to 5, further comprising zinc dialkyldithiocarbamate, which is contained in an amount of 0.05 to 5 mass % based on the total mass of the grease composition.

7. A wheel bearing where the grease composition described in any one of the above-mentioned items 1 to 6 is enclosed.

Effects of Invention

The present invention can provide a grease composition for a wheel bearing, which can satisfy the low torque performance, show a long anti-flaking life and a long lubrication life even under high temperatures, and minimize the fretting wear under minute vibrations at low temperatures; and a wheel bearing where the above-mentioned grease composition is filled.

BRIEF DESCRIPTION OF THE DRAWING

FIG. 1 This is a diagram showing a third-generation bearing for a driving wheel of the automobile.

DESCRIPTION OF EMBODIMENTS (a) Base Oil

The base oil used in the invention consists of a mineral oil and a synthetic hydrocarbon oil, wherein the ratio of the synthetic hydrocarbon oil to the total amount of the mineral oil and the synthetic hydrocarbon oil is 40 to 60 mass %, and the base oil has a kinematic viscosity at 40° C. of 40 to 65 mm²/s.

When the base oil is a mixture consisting of a mineral oil and a synthetic hydrocarbon oil and the ratio of the synthetic hydrocarbon oil is within the above-mentioned range, it becomes possible to ensure a sufficient thickness of the oil film at high temperatures, and at the same time, to decrease the kinematic viscosity of the base oil over a temperature range extending from the normal to low temperatures, so that the reduction of torque and the anti-flaking life and lubrication life at high temperatures can be both satisfied. When the ratio of the synthetic hydrocarbon oil exceeds 60 mass %, isocyanate used as a raw material of the urea thickener becomes less soluble due to the lowered solubility. This will require more thickener for obtaining a desired consistency, and consequently leads to the increase of torque. When the ratio of the synthetic hydrocarbon oil is less than 40 mass %, the oil film thickness cannot be ensured at high temperatures, so that the low torque performance and the anti-flaking life at high temperatures cannot be satisfied at the same time. In this case, the heat resistance of the base oil becomes insufficient because the ratio of the mineral oil increases, so that the satisfactory seizure life cannot be obtained. In particular, the ratio of the synthetic hydrocarbon oil may preferably be within a range of 45 to 55 mass % with respect to the total amount of the mineral oil and the synthetic hydrocarbon oil.

When the kinematic viscosity at 40° C. of the base oil exceeds 65 mm²/s, the low torque performance is not satisfactory even though the heat resistance is sufficient. On the other hand, when the kinematic viscosity at 40° C. is less than 40 mm²/s, it becomes impossible to satisfy the heat resistance and the anti-flaking properties even though the low torque performance can be achieved. The kinematic viscosity at 40° C. may be determined in accordance with the JIS K2220 23.

Two or more kinds of mineral oils and two or more kinds of synthetic hydrocarbon oils may be chosen separately. For example, a high-viscosity mineral oil and a low-viscosity mineral oil may be used in combination; a high-viscosity mineral oil, a low-viscosity mineral oil and a low-viscosity synthetic hydrocarbon oil may be used in combination; and a high-viscosity synthetic hydrocarbon oil and a low-viscosity synthetic hydrocarbon oil may be used in combination. Two or more synthetic hydrocarbon oils may be selected from a synthetic hydrocarbon oil having a kinematic viscosity at 40° C. of 200 to 1,000 mm²/s as the high-viscosity synthetic hydrocarbon oil, a synthetic hydrocarbon oil having a kinematic viscosity at 40° C. of 30 to 200 mm²/s as the medium-viscosity synthetic hydrocarbon oil, and a synthetic hydrocarbon oil having a kinematic viscosity at 40° C. of 10 to 30 mm²/s as the low-viscosity synthetic hydrocarbon oil.

Examples of the synthetic hydrocarbon oil include poly α-olefins and polybutene. Particularly, poly α-olefins are preferable.

The base oil may have a viscosity index of 100 to 160, more preferably 110 to 150. When the viscosity index of the base oil is within the above-mentioned range, the low torque performance and the anti-flaking life at high temperatures will advantageously further improve.

(b) Thickener

The thickener used in the invention is represented by the above-mentioned formula (A).

In the formula (A), $R^2$ represents diphenylmethane. $R^1$ and $R^3$, which may be the same or different from each other, each represent cyclohexyl group or a straight-chain or branched alkyl group having 16 to 20 carbon atoms. Of the straight-chain or branched alkyl groups having 16 to 20 carbon atoms, a straight alkyl group having 18 carbon atoms is preferable.

The molar ratio of the cyclohexyl group to the total number of moles of the cyclohexyl group and the alkyl group, expressed by [((the number of cyclohexyl groups)/(the number of cyclohexyl groups+the number of alkyl groups))×100] is 50 to 90 mol %, preferably 85 to 90 mol %.

By using the thickener mentioned above, in particular using the urea compound where the ratios of the cyclohexyl group and the alkyl group are as previously defined, the amount of thickener that is a solid component and contributes to the torque can be reduced, thereby satisfying the low torque performance. In addition, the thickener of formula (A) has excellent heat resistance under the high temperatures, so that the grease composition of the invention can show a long lubrication life.

The grease composition of the invention may preferably have a consistency of 200 to 400, more preferably 250 to 350. The content of the thickener is such an amount as necessary to obtain the above-mentioned consistency. Typically, the content of the thickener may preferably be 3 to 20 mass %, more preferably 5 to 20 mass %, and most preferably 8 to 15 mass %, based on the total mass of the grease composition.

(c) Antioxidant

An amine type antioxidant is used as the antioxidant. Use of the amine type antioxidant can prevent deterioration of the grease due to oxidation, and therefore further improve the lubrication life at high temperatures.

Examples of the amine type antioxidant that can be used in the invention include phenyl α-naphthylamine, alkylphenyl α-naphthylamine, alkyldiphenylamine and the like. In particular, alkyldiphenylamine is preferred.

In consideration of the effect, the content of the amine type antioxidant may typically be 0.05 to 5 mass %, and preferably 0.1 to 3 mass %, based on the total mass of the grease composition. With the content of less than 0.05 mass %, the oxidation-induced deterioration may not be prevented satisfactorily. However, when the content exceeds 5 mass %, the oxidation-induced deterioration prevention effect will be saturated although the effect can be obtained, so that the content of 5 mass % or less is economically advantageous.

(d) Antiwear Agent

An amine phosphate compound is used as the antiwear agent. The amine phosphate type antiwear agent reacts with the metallic surfaces of the inner and outer ring races and the rolling elements of the wheel bearing, to form a phosphate film. The phosphate film thus formed can serve to reduce the fretting wear that would occur between the contact surfaces under the conditions of low temperatures and minute vibrations, and also prevent the surface initiated flaking.

The amine phosphate used in the invention is not particularly limited. Preferable examples of the amine phosphate include tertiary alkylamine-dimethyl phosphate, phenylamine-phosphate and the like. The tertiary alkylamine-dimethyl phosphate is more preferable. As the amine phosphate compound, commercially available products such as Vanlube 672 (tertiary alkylamine-dimethyl phosphate, made by R.T. Vanderbilt Holding Company, Inc.); Vanlube 692 (phenylamine phosphate, made by R.T. Vanderbilt Holding Company, Inc.) and the like are usable.

The tertiary alkylamine-dimethyl phosphate is preferable as the amine phosphate type antiwear agent. In the tertiary alkylamine-dimethyl phosphate, the number of carbon atoms for the tertiary alkyl moiety is not particularly limited, and may possibly be 1 to 24, for example.

In consideration of the antiwear effect and the anti-flaking effect, the content of the amine phosphate type antiwear agent may typically be 0.05 to 5 mass % based on the total mass of the grease composition. With the content of less than 0.05 mass %, the fretting cannot be reduced satisfactorily. However, when the content exceeds 5 mass %, the fretting prevention effect will be saturated although the effect can be obtained, so that the content of 5 mass % or less is economically advantageous.

—Other Additives

To the grease composition of the invention, any additives that are generally used for grease may be added when necessary. For example, a rust inhibitor, anti-flaking additive, other antioxidants than the above-mentioned amine type, metallic corrosion inhibitor, oiliness improver, other antiwear agents than the above-mentioned amine phosphate type, extreme pressure agent, solid lubricant and the like may be incorporated. Of those additives, the rust inhibitor and the anti-flaking additive may preferably be incorporated.

There is no restrictions on the contents of those auxiliary additives as far as the effects of the invention may not be impaired, but the contents of those additives may typically be 0.1 to 20 mass % of the total mass of the grease composition. With the contents of less than 0.1 mass %, the resulting effects of the additives will be insufficient. However, when the contents exceeds 20 mass %, the effects will be saturated, and there may be a risk of the lubricating properties being lowered because the amount of base oil is relatively reduced.

(e) Rust Inhibitor

An organic sulfonate and an amine compound can be used for the rust inhibitor. It is preferable to use the organic sulfonate and the amine compound in combination as the rust inhibitor. By using the organic sulfonate and the amine compound in combination, the rust inhibiting properties will be superior to the conventional ones.

In the above-mentioned sulfonate, petroleum sulfonic acid, dinonylnaphthalene sulfonic acid and the like can be given as examples of the sulfonic acid component. The sulfonate in the form of a metallic salt is preferable, and in particular, calcium salt, magnesium salt, sodium salt, potassium salt, lithium salt, zinc salt and the like can be given as examples. Particularly, a calcium sulfonate is preferable, and calcium dinonylnaphthalene sulfonate is more preferable.

As the amine compound, a fatty acid amine salt is preferable. As the fatty acid moiety for constituting the fatty acid amine salt, fatty acids having 4 to 22 carbon atoms are preferable, and fatty acids having 8 to 18 carbon atoms are more preferable. The fatty acids may be saturated or unsaturated, and the straight-chain fatty acids, branched fatty acids, cyclic fatty acids and hydroxy fatty acids may be used. Specific examples of the fatty acids include stearic acid, palmitic acid, myristic acid, lauric acid, isostearic acid, octanoic acid, undecylenic acid, oleic acid, hydroxystearic acid and the like. The amine for constituting the above-mentioned fatty acid amine salt is not particularly limited, but saturated or unsaturated amines having 1 to 42 carbon atoms are preferable, and saturated or unsaturated amines having 4 to 22 carbon atoms are more preferable. To be specific, octylamine, laurylamine, myristylamine, stearylamine, behenylamine, oleylamine, tallow alkylamine, hydrogenated tallow alkylamine, aniline, benzylamine, cyclohexylamine, diethylamine, dipropylamine, dibutylamine, diphenyl amine, dibenzylamine, dicyclohexylamine, triethylamine, tributylamine, dimethyl octylamine, dimethyl decylamine, dimethyl stearylamine, dimethyl tallow alkylamine, dimethyl hydrogenated tallow alkylamine, dimethyl oleylamine and the like can be used. Particularly, a mixture of two kinds of amine salts (with a ratio by mass of 2:1), i.e., a salt of a fatty acid with eight carbon atoms and an amine with 12 carbon atoms and a salt of a fatty acid with 18 carbon atoms and amines having 12 to 20 carbon atoms is preferably used.

For the rust inhibitor, it is most preferable to use calcium dinonylnaphthalene sulfonate in combination with a mixture of two kinds of salts (with a ratio by mass of 2:1), i.e., a salt of a fatty acid with eight carbon atoms and an amine with 12 carbon atoms and a salt of a fatty acid with 18 carbon atoms and amines having 12 to 20 carbon atoms.

The content of the rust inhibitor may typically be within the range of 0.05 to 5 mass % based on the total mass of the grease composition. With the content of less than 0.05 mass %, rust cannot be prevented satisfactorily. When the content exceeds 5 mass %, the rust prevention effect can be obtained, but the effect will be saturated, and the bearing lubrication life will be reduced, so that the content of 5 mass % or less is recommended.

(f) Anti-Flaking Additive

When zinc dialkyldithiocarbamate is used as the anti-flaking additive in addition to the amine phosphate type antiwear agent, the anti-flaking properties can be further improved.

In consideration of the effect, the content of zinc dialkyldithiocarbamate may typically be 0.05 to 5 mass % based on the total mass of the grease composition. With the content of less than 0.05 mass %, the effect resulting from the use of the anti-flaking additive together with the amine phosphate type antiwear agent cannot be exhibited. However, when the content exceeds 5 mass %, that effect will be saturated, so that the content of 5 mass % or less is economically advantageous.

The preparation method for the composition of the invention is not particularly limited, and any methods are available. Specifically, after the amine and the isocyanate are separately added to the base oil and dissolved therein, the resulting two liquids are allowed to react with each other. The reaction mixture is heated to a predetermined temperature and then cooled down. With addition of the additives, the resultant mixture is kneaded using a roll mill or the like to prepare a grease composition.

—Wheel Bearing

One embodiment of a wheel bearing according to the invention where the grease composition of the invention is applied to an automotive wheel bearing will now be explained by referring to the drawing.

By way of example, FIG. 1 shows a third-generation bearing for the automotive driving wheel. In this FIGURE, an inner ring 1 also serves as a hub ring. The edge face of an inner ring 2 on the smaller diameter side thereof is fitted into the shoulder portion of the inner ring 1, thereby constituting a double row angular contact ball bearing in a back-to-back arrangement. A wheel mounting flange 1*a* for mounting a wheel (not shown) and a raceway surface corresponding to the raceway surface of the outer ring 3 on the outboard side and a cylindrical small-diameter stepped portion 1*b* for fitting the inner ring 2 on the inboard side are integrally formed on the outer circumferential surface of the inner ring 1. The inner ring 2 is press-fitted into the small-diameter stepped portion 1*b* of the inner ring 1 with a predetermined interference, and fixed in the axial direction with respect to the inner ring 1. Serrations (or splines) for transmitting the torque are formed on the inner circumferential surface of the inner ring 1. On the wheel mounting flange 1*a*, hub bolts are fixed at regular intervals on the circumference. The inner ring 1 is fixed to the wheel side when the wheel is fastened to the wheel mounting flange 1*a*.

A mounting flange 3*a* is integrally formed on the outer circumferential surface of the outer ring 3. The outer ring 3 is fixed to the side of a car body when the mounting flange 3*a* is fastened to a knuckle of a suspension (not shown).

Rolling elements 4 incorporated into the space between the double-row raceway surfaces on the outer ring 3 and the raceway surfaces on the inner rings 1 and 2 are retained by cages 5, 5 respectively.

Openings of a ring-shaped space formed between the inner rings 1, 2 and the outer ring 3 are hermetically sealed with seals 6 and 7 which are fixed to the outer ring 3. The seals 6 and 7 serve to prevent a lubricating grease enclosed in the bearing from leaking out and prevent muddy water, rainwater, dust and the like from penetrating from the outside into the bearing. A constant velocity universal joint 8 is connected to the inner ring 1. An external joint member of the constant velocity universal joint 8 is engaged with the serrations formed on the inner circumferential surface of the inner ring 1, and connected detachably to the inner ring 1 so as to allow the transmission of torque by fastening a fixing nut 10 screwed into a screw shaft of the external joint member. Hermetically sealed spaces 9 between the seals 6 and 7 are charged with a predetermined amount of the grease composition according to the invention.

EXAMPLES

<Preparation of Test Grease Compositions>

The grease compositions according to Examples and Comparative Examples were prepared using the thickeners and the base oils shown in the following Tables. To be more specific, diphenylmethane diisocyanate (1 mole) and the predetermined amines (2 moles) were allowed to react in the base oil as shown in Tables. The resultant mixture was heated and then cooled, and adjusted to have a worked penetration of 280 (in accordance with the test method of JIS K2220 7.) using a three-roll mill, thereby obtaining grease compositions of Examples 1 to 11 and Comparative Examples 1 to 9. The kinematic viscosities of the base oils at 40° C. were determined in accordance with the JIS K2220 23. In Tables 1 and 2, the values indicated by "mass %" mean the ratio to the total mass of the grease composition. The balance was compensated with the base oil. In Tables 1 and 2, the ratio by weight of mineral oil (wt %) represents the proportion of the mineral oil to the total weight of the mineral oil and the synthetic hydrocarbon oil; and the ratio by weight of synthetic hydrocarbon oil (wt %) represents the proportion of the synthetic hydrocarbon oil to the total weight of the mineral oil and the synthetic hydrocarbon oil.

(a) Base Oil

<Mineral Oils>

High-viscosity mineral oil (kinematic viscosity at 40° C.: 100 mm$^2$/s)

Low-viscosity mineral oil (kinematic viscosity at 40° C.: 40 mm$^2$/s)

<Synthetic Hydrocarbon Oils>
  Medium-viscosity synthetic hydrocarbon oil (kinematic viscosity at 40° C.: 48 mm$^2$/s)
  High-viscosity synthetic hydrocarbon oil (kinematic viscosity at 40° C.: 400 mm$^2$/s)
  Low-viscosity synthetic hydrocarbon oil (kinematic viscosity at 40° C.: 18 mm$^2$/s)
(b) Thickener
  Reaction product of diphenylmethane diisocyanate (1 mole) and a mixture of cyclohexylamine and stearylamine (2 moles in total)
  Reaction product of diphenylmethane diisocyanate (1 mole) and cyclohexylamine (2 moles)
  Reaction product of diphenylmethane diisocyanate (1 mole) and para-toluidine (2 moles)
(c) Amine Type Antioxidant
  Alkyldiphenylamine (IRGANOX L-57, made by BASF Japan)
(d) Amine Phosphate Type Antiwear Agent
  Tertiary alkylamine-dimethyl phosphate (Vanlube 672, made by R.T. Vanderbilt Holding Company, Inc.)
Optional Components
(e) Rust Inhibitor
—Fatty Acid Amine Salt:
  A mixture of two kinds of amine salts (with a ratio by mass of 2:1), i.e., a salt of a fatty acid with eight carbon atoms and an amine with 12 carbon atoms and a salt of a fatty acid with 18 carbon atoms and amines having 12 to 20 carbon atoms.
—Calcium Sulfonate:
  Calcium Dinonylnaphthalene Sulfonate
(f) Anti-Flaking Additive
  Zinc dialkyldithiocarbamate (where alkyl groups have both five carbon atoms)
<Test Methods and Judgment>
[Low Torque Performance]
Evaluation Method
Rheometer Test (Apparent Viscosity)
  The test was conducted using a tester for determining viscoelastic properties, Physica MCR301 made by Nihon SiberHegner K.K.
  A test grease was applied to the gap between the predetermined plates, the distance between the plates was set to a predetermined value, and then extra grease pressed out was removed. After that, the apparent viscosity was determined when the plates were rotated at the shear rate shown below. The test conditions are shown below. The average of the apparent viscosities at the shear rates of 10 to $10^3$ s$^{-1}$ was calculated, which was the result of determination.
  Shear rate: 10 to $10^3$ s$^{-1}$
  Testing temperature: 25° C.
  Plate—Cone type
  Cone angle: 2°
  Distance between plates: 0.05 mm
  Plate diameter: 25 mm
—Judgment
  Apparent viscosity (average):
  13.0 Pa·s or less: o (acceptable)
  More than 13.0 Pa·s: x (unacceptable)
[Heat resistance (Bearing lubrication life)]
—Evaluation Method
  The test was conducted using a bearing lubrication life tester in accordance with ASTM D3336.
  The time was measured until the motor caused overcurrent (4 A or more) or the outer ring temperature of the bearing became higher than the testing temperature by 15° C. The shorter time was regarded as the seizure life.
  Bearing type: 6204 metal sealed bearing
  Testing temperature: 150° C.
  The number of revolutions: 10,000 rpm
  Amount of grease: 1.8 g
  Test loads: axial load 66.7 N
  radial load 66.7 N
—Judgment:
  Bearing lubrication life:
  1800 hours or more: o (acceptable)
  Less than 1800 hours: x (unacceptable)
[Anti-Flaking Properties]
—The Test was Conducted Using a Tester of Four Rolling Steel Balls.
  The outline of the test method is shown below.
  Three steel balls with a diameter of 15 mm designed for bearings were disposed in a container with an inner diameter of 40 mm and a height of 14 mm, which was filled with about 20 g of each test grease composition. Another steel ball (⅝-in) for bearing was set to a tester so that the steel ball (⅝-in) was placed in contact with the top of the three steel balls. When the steel ball (⅝-in) was driven to rotate at the predetermined rotational speed, the lower three balls revolved as each rotating on its axis. The ball was driven to rotate continuously until the flaking took place on the steel ball surfaces.
  The flaking occurs at a point between the two balls where the highest contact pressure is applied.
  The life was expressed as the number of revolutions of the upper ball.
—Test Conditions
  Steel balls for test: a ⅝-in steel ball for bearing (rotating ball), and 15-mm-dia.
  steel balls for bearing (driven balls)
  Load for test: 400 kgf (6.5 GPa)
  Rotational speed: 1200 rpm
  The repeated number of tests: 3 (the average life: the average taken when n=3)
—Judgment
  The number of revolutions of the upper steel ball:
  130×10$^5$ or more: o (acceptable)
  Less than 130×10$^5$: x (unacceptable) [Anti-Fretting Properties]
—Evaluation method
  Fafnir friction oxidation test
  The test was conducted in accordance with ASTM D 4170.
  Each test grease was applied to a pair of test thrust bearings as shown below, and then the bearings were subjected to a prescribed oscillation motion to determine the abrasion wear (weight loss by the fretting wear).
  Bearing: ANDREWS W 5/8
  Load: 2450 N (contact pressure: 1.9 GPa)
  Angle of oscillation: ±1°
  Oscillation cycle: 25 Hz
  Duration: 22 hours
  Temperature: −30° C.
  Filling amount of grease: 1.0 g per pair of bearings
  Abrasion wear: weight loss of the race per pair of bearings (the total weight loss of the test bearing races/2)
—Judgment
  Abrasion wear:
  Less than 3.0 mg: o (acceptable)
  3.0 mg or more: x (unacceptable)
[Overall Evaluations]
o (acceptable): The results of all the evaluation items of the low torque performance, heat resistance, anti-flaking properties and anti-fretting properties were acceptable (o).
x (unacceptable): Of the low torque performance, heat resistance, anti-flaking properties and anti-fretting properties, one or more results were unacceptable (x).

TABLE 1

|  |  |  | Examples ||||||| 
| --- | --- | --- | --- | --- | --- | --- | --- | --- | --- |
|  |  |  | 1 | 2 | 3 | 4 | 5 | 6 | 7 |
| (b) Thickener |  | Diphenylmethane diisocyanate (Molar ratio) | 50 | 50 | 50 | 50 | 50 | 50 | 50 |
|  |  | Cyclohexylamine (Molar ratio) | 87.5 | 70 | 80 | 90 | 87.5 | 87.5 | 87.5 |
|  |  | Stearylamine (Molar ratio) | 12.5 | 30 | 20 | 10 | 12.5 | 12.5 | 12.5 |
| Amount of thickener (mass %) |  |  | 11.0 | 12.0 | 11.0 | 11.0 | 11.5 | 11.0 | 11.0 |
| (a) Base oil | Mineral oil (wt %) | High-viscosity mineral oil | 50 | 50 | 50 | 50 | 40 | 60 | 50 |
|  | Synthetic hydrocarbon oil (wt %) | Medium-viscosity synthetic hydrocarbon oil | 50 | 50 | 50 | 50 | 58 | 25 | 10 |
|  |  | High-viscosity synthetic hydrocarbon oil | — | — | — | — | 2 | — | — |
|  |  | Low-viscosity synthetic hydrocarbon oil | — | — | — | — | — | 15 | 40 |
|  | Kinematic viscosity (40° C.) mm²/s |  | 63 | 63 | 63 | 63 | 64 | 60 | 43 |
|  | Viscosity index |  | 120 | 120 | 120 | 120 | 120 | 112 | 112 |
| Additives | (c) Antioxidant (mass %) | Amine type | 1 | 1 | 1 | 1 | 1 | 1 | 1 |
|  | (d) Antiwear agent (mass %) | Amine phosphate | 1 | 1 | 1 | 1 | 1 | 1 | 1 |
|  | (e) Rust inhibitor (mass %) | Fatty acid amine salt | 0.5 | 0.5 | 0.5 | 0.5 | 0.5 | 0.5 | 0.5 |
|  |  | Calcium sulfonate | 2 | 2 | 2 | 2 | 2 | 2 | 2 |
|  | (f) Anti-flaking additive (mass %) | Zinc dialkyldithiocarbamate | 1 | 1 | 1 | 1 | 1 | 1 | 1 |
| Worked penetration |  |  | 280 | 280 | 280 | 280 | 280 | 280 | 280 |
| Low torque performance | Results | Apparent viscosity (Pa · s) | 10.5 | 13.0 | 10.8 | 10.9 | 11.5 | 10.7 | 10.1 |
|  | Judgment |  | ○ | ○ | ○ | ○ | ○ | ○ | ○ |
| Heat resistance | Results | Bearing lubrication life (h) | 2470 | 2200 | 2320 | 2380 | 2560 | 2110 | 2000 |
|  | Judgment |  | ○ | ○ | ○ | ○ | ○ | ○ | ○ |
| Anti-flaking properties | Results | No. of revolutions of upper steel ball (×10⁵) | 180 | 173 | 177 | 165 | 170 | 171 | 150 |
|  | Judgment |  | ○ | ○ | ○ | ○ | ○ | ○ | ○ |
| Anti-fretting properties | Results | Abrasion wear (mg) | 1.4 | 1.5 | 1.5 | 1.5 | 1.2 | 1.6 | 1.4 |
|  | Judgment |  | ○ | ○ | ○ | ○ | ○ | ○ | ○ |
| Overall evaluations |  |  | ○ | ○ | ○ | ○ | ○ | ○ | ○ |

|  |  |  | Examples ||||||
| --- | --- | --- | --- | --- | --- | --- | --- | --- |
|  |  |  | 8 | 9 | 10 | 11 | 12 | 13 |
| (b) Thickener |  | Diphenylmethane diisocyanate (Molar ratio) | 50 | 50 | 50 | 50 | 50 | 50 |
|  |  | Cyclohexylamine (Molar ratio) | 87.5 | 87.5 | 87.5 | 87.5 | 87.5 | 87.5 |
|  |  | Stearylamine (Molar ratio) | 12.5 | 12.5 | 12.5 | 12.5 | 12.5 | 12.5 |
| Amount of thickener (mass %) |  |  | 11.0 | 11.0 | 11.0 | 11.0 | 11.0 | 11.0 |
| (a) Base oil | Mineral oil (wt %) | High-viscosity mineral oil | 50 | 50 | 50 | 50 | 50 | 50 |
|  | Synthetic hydrocarbon oil (wt %) | Medium-viscosity synthetic hydrocarbon oil | 49 | 50 | 50 | 50 | 50 | 50 |
|  |  | High-viscosity synthetic hydrocarbon oil | 1 | — | — | — | — | — |
|  |  | Low-viscosity synthetic hydrocarbon oil | — | — | — | — | — | — |
|  | Kinematic viscosity (40° C.) mm²/s |  | 65 | 63 | 63 | 63 | 63 | 63 |
|  | Viscosity index |  | 118 | 120 | 120 | 120 | 120 | 120 |
| Additives | (c) Antioxidant (mass %) | Amine type | 1 | 0.05 | 5 | 1 | 1 | 1 |
|  | (d) Antiwear agent (mass %) | Amine phosphate | 1 | 1 | 1 | 0.05 | 5 | 1 |
|  | (e) Rust inhibitor (mass %) | Fatty acid amine salt | 0.5 | 0.5 | 0.5 | 0.5 | 0.5 | 0.5 |
|  |  | Calcium sulfonate | 2 | 2 | 2 | 2 | 2 | 2 |
|  | (f) Anti-flaking additive (mass %) | Zinc dialkyldithiocarbamate | 1 | 1 | 1 | 1 | 1 | — |
| Worked penetration |  |  | 280 | 280 | 280 | 280 | 280 | 280 |
| Low torque performance | Results | Apparent viscosity (Pa · s) | 11.4 | 10.5 | 10.4 | 10.6 | 10.3 | 10.6 |
|  | Judgment |  | ○ | ○ | ○ | ○ | ○ | ○ |
| Heat resistance | Results | Bearing lubrication life (h) | 2640 | 1830 | 2780 | 2420 | 2490 | 2420 |
|  | Judgment |  | ○ | ○ | ○ | ○ | ○ | ○ |
| Anti-flaking properties | Results | No. of revolutions of upper steel ball (×10⁵) | 180 | 174 | 175 | 142 | 182 | 160 |
|  | Judgment |  | ○ | ○ | ○ | ○ | ○ | ○ |
| Anti-fretting properties | Results | Abrasion wear (mg) | 1.7 | 1.6 | 1.6 | 2.7 | 1.4 | 1.4 |
|  | Judgment |  | ○ | ○ | ○ | ○ | ○ | ○ |
| Overall evaluations |  |  | ○ | ○ | ○ | ○ | ○ | ○ |

TABLE 2

|  |  |  | \multicolumn{9}{c}{Comparative Examples} |
|---|---|---|---|---|---|---|---|---|---|---|---|
|  |  |  | 1 | 2 | 3 | 4 | 5 | 6 | 7 | 8 | 9 |
| (b) Thickener | Diphenylmethane diisocyanate (Molar ratio) | | 50 | 50 | 50 | 50 | 50 | 50 | 50 | 50 | 50 |
|  | Cyclohexylamine (Molar ratio) | | 40 | 100 | 87.5 | 87.5 | 87.5 | 87.5 | 87.5 | 87.5 | — |
|  | Stearylamine (Molar ratio) | | 60 | 0 | 12.5 | 12.5 | 12.5 | 12.5 | 12.5 | 12.5 | — |
|  | para-toluidine (Molar ratio) | | — | — | — | — | — | — | — | — | 100 |
| Amount of thickener (mass %) | | | 12.5 | 15.0 | 12.5 | 11.0 | 11.0 | 11.0 | 11.0 | 11.0 | 20.0 |
| (a) Base oil | Mineral oil (wt %) | High-viscosity mineral oil | 50 | 50 | 30 | 70 | 20 | 50 | 50 | 50 | 50 |
|  |  | Low-viscosity mineral oil | — | — | — | — | 30 | — | — | — | — |
|  | Synthetic hydrocarbon oil (wt %) | Medium-viscosity synthetic hydrocarbon oil | 50 | 50 | 65 | 15 | — | 40 | 50 | 50 | 50 |
|  |  | High-viscosity synthetic hydrocarbon oil | — | — | — | — | — | 10 | — | — | — |
|  |  | Low-viscosity synthetic hydrocarbon oil | — | — | 5 | 15 | 50 | — | — | — | — |
|  | Kinematic viscosity (40° C.) mm2/s | | 63 | 63 | 55 | 64 | 30 | 83 | 63 | 63 | 63 |
|  | Viscosity index | | 120 | 120 | 124 | 107 | 115 | 120 | 120 | 120 | 120 |
| Additives | (c) Antioxidant (mass %) | Amine type | 1 | 1 | 1 | 1 | 1 | 1 | — | 1 | 1 |
|  |  | Phenol type | — | — | — | — | — | — | 1 | — | — |
|  | (d) Antiwear agent (mass %) | Amine phosphate | 1 | 1 | 1 | 1 | 1 | 1 | 1 | — | 1 |
|  |  | Tricresyl phosphate | — | — | — | — | — | — | — | 1 | — |
|  | (e) Rust inhibitor (mass %) | Fatty acid amine salt | 0.5 | 0.5 | 0.5 | 0.5 | 0.5 | 0.5 | 0.5 | 0.5 | 0.5 |
|  |  | Calcium sulfonate | 2 | 2 | 2 | 2 | 2 | 2 | 2 | 2 | 2 |
|  | (f) Anti-flaking additive (mass %) | Zinc dialkyldithiocarbamate | 1 | 1 | 1 | 1 | 1 | 1 | 1 | 1 | 1 |
| Worked penetration | | | 280 | 280 | 280 | 280 | 280 | 280 | 280 | 280 | 280 |
| Low torque performance | Results | Apparent viscosity (Pa · s) | 13.6 | 14.2 | 13.7 | 10.9 | 9.5 | 13.7 | 10.5 | 10.5 | 16.4 |
|  | Judgment | | x | x | x | ○ | ○ | x | ○ | ○ | x |
| Heat resistance | Results | Bearing lubrication life (h) | 2000 | 1700 | 2740 | 1680 | 1540 | 2660 | 1730 | 2390 | 1720 |
|  | Judgment | | ○ | x | ○ | x | x | ○ | x | ○ | x |
| Anti-flaking properties | Results | No. of revolutions of upper steel ball (×10$^5$) | 170 | 164 | 165 | 165 | 126 | 177 | 170 | 43 | 160 |
|  | Judgment | | ○ | ○ | ○ | ○ | x | ○ | ○ | x | ○ |
| Anti-fretting properties | Results | Abrasion wear (mg) | 1.8 | 1.6 | 1.3 | 3.2 | 1.3 | 2.1 | 1.8 | 6.2 | 1.6 |
|  | Judgment | | ○ | ○ | ○ | x | ○ | ○ | ○ | x | ○ |
| Overall evaluations | | | x | x | x | x | x | x | x | x | x |

EXPLANATION OF NUMERALS 1, 2 Inner ring
3 Outer ring
4 Rolling elements
5 Cage
6, 7 Seal
8 Constant velocity universal joint
10 Fixing nut

The invention claimed is:

1. A grease composition for a wheel bearing, comprising;
(a) a base oil consisting of a mineral oil and poly-alpha-olefin, wherein an amount of the poly-alpha-olefin to a total amount of the mineral oil and the poly-alpha-olefin is 40 to 60 mass %, the base oil has a kinematic viscosity at 40° C. of 40 to 65 mm$^2$/s, and the base oil has a viscosity index of 100 to 120;
(b) a thickener represented by formula (A):

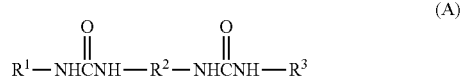

(A)

wherein R$^2$ is diphenylmethane; and R$^1$ and R$^3$, which may be the same or different from each other, each represents cyclohexyl group or a straight-chain or branched alkyl group having 16 to 20 carbon atoms, with a molar ratio of the cyclohexyl group to the total number of moles of the cyclohexyl group and the alkyl group, expressed by [((the number of cyclohexyl groups)/(the number of cyclohexyl groups+the number of alkyl groups))×100] being 50 to 90 mol %;
(c) an amine type antioxidant; and
(d) an amine phosphate type antiwear agent.

2. The grease composition of claim 1, wherein the amine phosphate type antiwear agent is a tertiary alkylamine-dimethyl phosphate, which is contained in an amount of 0.05 to 5 mass % based on the total mass of the grease composition.

3. The grease composition of claim 1, further comprising a rust inhibitor comprising an organic sulfonate and an amine compound.

4. The grease composition of claim 3, wherein the organic sulfonate is a calcium sulfonate, which is contained in an amount of 0.05 to 5 mass % based on the total mass of the grease composition.

5. The grease composition of claim 3, wherein the amine compound is an amine salt of a fatty acid, which is contained in an amount of 0.05 to 5 mass % based on the total mass of the grease composition.

6. The grease composition of claim 1, further comprising zinc dialkyldithiocarbamate, which is contained in an amount of 0.05 to 5 mass % based on the total mass of the grease composition.

7. A wheel bearing where the grease composition of claim 1 is enclosed.

8. The grease composition of claim 1, wherein the content of the thickener is 3 to 20 mass % based on the total mass of the grease composition.

9. The grease composition of claim 1, wherein the content of the amine type antioxidant is 0.05 to 5 mass % based on the total mass of the grease composition.

10. The grease composition of claim 1, wherein the amine type antioxidant is phenyl a-naphthylamine, alkylphenyl a-naphthylamine, or alkyldiphenylamine.

* * * * *